No. 704,316. Patented July 8, 1902.
J. GIESHOIDT.
MACHINE FOR DRAWING TUBES.
(Application filed Aug. 28, 1900.)
(No Model.)
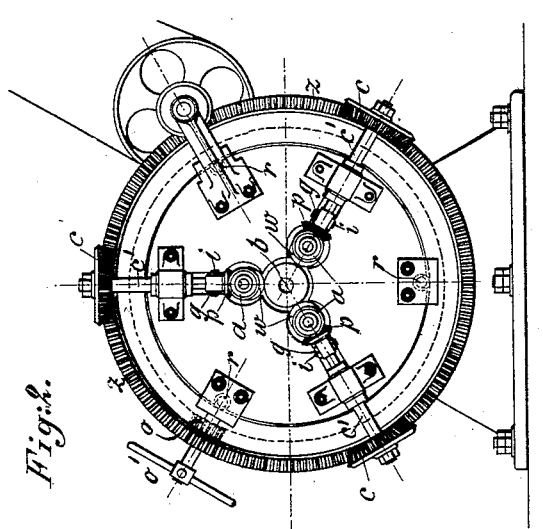
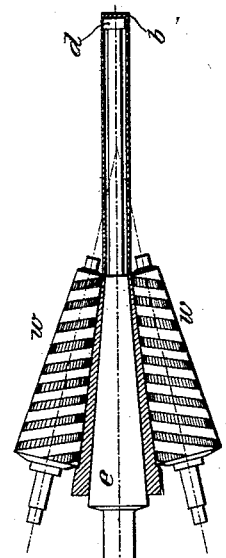
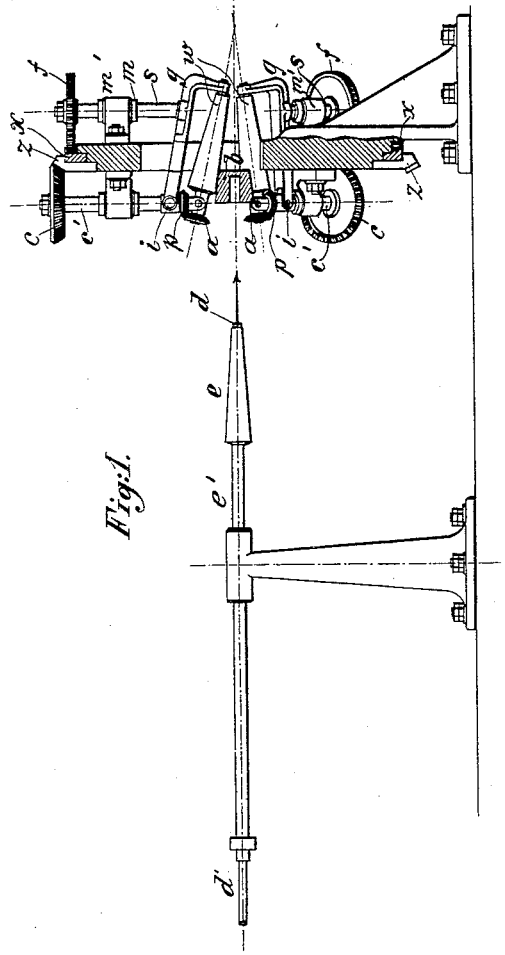
Witnesses
John Hickman
William Schulz
Inventor:
Josef Gieshoidt
by his attorneys
Roeder & Briesen

UNITED STATES PATENT OFFICE.

JOSEF GIESHOIDT, OF DUSSELDORF, GERMANY.

MACHINE FOR DRAWING TUBES.

SPECIFICATION forming part of Letters Patent No. 704,316, dated July 8, 1902.

Application filed August 28, 1900. Serial No. 28,268. (No model.)

*To all whom it may concern:*

Be it known that I, JOSEF GIESHOIDT, merchant, a citizen of Germany, and a resident of Dusseldorf, Germany, have invented certain new and useful Improvements in Machinery for Drawing Tubes, of which the following is a specification.

This invention relates to machinery for drawing tubes of any desired length from short blocks in a comparatively short time.

In the accompanying drawings, Figure 1 is a sectional elevation of a tube rolling or drawing mill embodying my invention. Fig. 2 is an end view of the same, and Fig. 3 a detail view showing the principal operating-tools on a larger scale.

Three or more rollers $w$, provided with helical threads, are arranged around a common axis (the axis of the machine) in such a manner that the open space between the rollers is gradually getting narrower from one end of the rollers to the other.

In the axis of the machine are mounted a pair of mandrels $d$ and $e$, so as to be capable of sliding longitudinally and of rotating in the same direction as the rollers and the ingot. The mandrel $e$ is hollow and has the shape of a truncated cone formed at (or fixed to) one end of a tubular rod $e'$, while the rod $d'$, carrying the mandrel $d$, is adapted to slide axially in the bore of the mandrel $e$ and its tubular rod. The piece of raw material to be rolled or drawn out by the present apparatus has preferably the shape of a thick conical disk provided with an axial opening, which does not extend through the entire thickness of the disk, but leaves a layer $b$ intact to form the bottom of the tube. This layer $b$ serves as a support or abutment for the mandrel $d$, introduced into the opening.

The piece of work which has been heated to a suitable temperature is introduced at the wide end of the clearance-space left between the rollers $w$ while the latter are in motion, and pressure is exerted on the material by the mandrels advancing in the direction of their axis. Owing to the helical threads formed in the surface of the rollers the soft material is at the same time pressed forward until the front edge of the mandrel $e$ is approximately in line with the front edges of the rollers $w$. Thereupon the mandrel $e$ remains stationary, while the mandrel $d$ continues to advance. Owing to the pressure of the mandrels and the helical threads of the rollers, the outer layer of the raw material is gradually thrust forward, and a tubular body is formed, supported by the mandrel $d$, which follows the front end of the same.

As a rule the rollers $w$ have a conical shape, corresponding to the conicity of the piece of work to be formed by the rollers. This has the advantage that the rollers impart to all parts of the surface of the piece of work a uniform rotation—viz., a rotary motion at the same circumferential speed—so as to prevent one zone of the said surface from being twisted against the other and the fiber of the material from being torn.

Rotary motion is imparted to the rollers by a toothed rim or ring $z$, which is guided concentrically to the mandrels by a group of guide-rollers $r$, mounted on the machine-frame.

The conically-toothed rim $z$ gears into the bevel-wheels $c$, mounted on the outer extremity of axles $c'$, placed radially to the axis of the machine. The inner extremities of the said radial axles $c'$ carry smaller bevel-wheels $p$, gearing into bevel-wheels $a$, mounted on the axles or journals of the rollers $w$. The opposite end of the rollers $w$ have their bearings in fork-arms or holders $g$, pivoted at $i$ on sleeves mounted on the axles $c'$. Each of the forks or holders $g$ is connected with the inner extremity of a radial screw-spindle $s$, the screw-thread of which passes through a screw-nut $m$, held in a bracket $m'$, fixed to the machine-frame. Consequently by turning the spindles $s$ or the nuts $m$ on their respective axes the forks $g$ may be caused to approach the axis of the machine or to recede from the same. In the example represented by the drawings spur-wheels $f$, gearing into a toothed rim $x$, are mounted on the extremities of the spindles $s$, instead of which they could, however, be mounted on the nuts $m$. The toothed rim is located at the back of the rim $z$, but is movable independently of the same by means of a tooth-wheel $o$, controlled by a hand-wheel o', so that by turning the latter the spindles s will be set in motion simultaneously and uniformly.

In order that the clearance-space between the rear end of the rollers may not become excessive and the clearance-space between the front ends too small—in other words, that the difference between the clearance-space at the two ends may not become too great in consequence of the adjustment of the forks g—the fulcrum i of the latter may be placed beyond the roller-bearings. Instead of turning on a pivot the forks g may be adapted for adjustment by a parallel or sliding motion.

The motion of the mandrels may be produced in any convenient manner—for instance, by means of levers or hydraulic pressure or by means of a screw-thread, or it may be produced by the driving mechanism of the machine or by hand.

What I claim is—

In a tube-drawing machine, the combination of a conical hollow axially-movable outer mandrel, with an inner mandrel axially movable within the outer mandrel, a series of conical drawing-rolls, and separate means for radially adjusting each end of said rolls, substantially as specified.

Signed by me at Dusseldorf, Germany, this 7th day of August, 1900.

JOSEF GIESHOIDT.

Witnesses:
WILLIAM ESSENWEIN,
PETER LIEBER.